under 35

(12) United States Patent  (10) Patent No.: US 8,538,702 B2
Neelamani et al.  (45) Date of Patent: Sep. 17, 2013

(54) GEOLOGIC FEATURES FROM CURVELET BASED SEISMIC ATTRIBUTES

(75) Inventors: Ramesh Neelamani, Houston, TX (US); David R. Converse, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 547 days.

(21) Appl. No.: 12/602,413

(22) PCT Filed: Jun. 2, 2008

(86) PCT No.: PCT/US2008/006949
§ 371 (c)(1),
(2), (4) Date: Nov. 30, 2009

(87) PCT Pub. No.: WO2009/011735
PCT Pub. Date: Jan. 22, 2009

(65) Prior Publication Data
US 2010/0186950 A1  Jul. 29, 2010

Related U.S. Application Data

(60) Provisional application No. 60/959,653, filed on Jul. 16, 2007.

(51) Int. Cl.
*G01V 1/28* (2006.01)
(52) U.S. Cl.
USPC .......................................................... 702/14
(58) Field of Classification Search
USPC ............... 702/2, 11, 14, 17, 75–77, 173, 183, 702/191, 194, 195, 199; 708/400
See application file for complete search history.

(56) References Cited

U.S. PATENT DOCUMENTS

| 4,894,795 A | 1/1990 | Whitehouse et al. ......... 364/807 |
| 4,916,615 A | 4/1990 | Chittineni |
| 4,992,995 A | 2/1991 | Favret |
| 5,047,991 A | 9/1991 | Hsu |
| 5,265,192 A | 11/1993 | McCormack |
| 5,274,714 A | 12/1993 | Hutcheson et al. |

(Continued)

FOREIGN PATENT DOCUMENTS

| CA | 2571094 | 12/2006 |
| WO | WO 98/20367 | 5/1998 |

(Continued)

OTHER PUBLICATIONS

Nguyen Thanh Binh and Nguyen Chi Thanh, "Object detection of Speckle image based on curvelet transform", vol. 2, No. 3, Jun. 2007, pp. 14-16, aRPN Journal of Engineering and Applied Sciences.*

(Continued)

*Primary Examiner* — Mohamed Charioui
(74) *Attorney, Agent, or Firm* — ExxonMobil Upstream Research Company Law Dept.

(57) ABSTRACT

Method for identifying geologic features, such as hydrocarbon indicators, from geophysical data, such as seismic data, by taking a curvelet transform of the data. After the curvelet representation of the data is computed (350), selected geophysical data attributes and their interdependencies are extracted (355), from which geological features may be identified (360), either from attribute data volumes that are created or directly from the curvelet representation.

24 Claims, 7 Drawing Sheets

(56) References Cited

U.S. PATENT DOCUMENTS

| | | | |
|---|---|---|---|
| 5,384,725 A | 1/1995 | Coifman et al. | 364/807 |
| 5,416,750 A | 5/1995 | Doyen et al. | |
| 5,444,619 A | 8/1995 | Hoskins et al. | |
| 5,465,308 A | 11/1995 | Hutcheson et al. | |
| 5,539,704 A | 7/1996 | Doyen et al. | |
| 5,563,949 A | 10/1996 | Bahorich et al. | 364/421 |
| 5,586,082 A | 12/1996 | Anderson et al. | |
| 5,852,588 A | 12/1998 | de Hoop et al. | |
| 5,940,777 A | 8/1999 | Keskes | |
| 5,940,778 A | 8/1999 | Marfurt et al. | 702/16 |
| 6,052,650 A | 4/2000 | Assa et al. | |
| 6,131,071 A | 10/2000 | Partyka et al. | 702/16 |
| 6,226,596 B1 | 5/2001 | Gao | |
| 6,236,942 B1 | 5/2001 | Bush | |
| 6,295,504 B1 | 9/2001 | Y et al. | |
| 6,363,327 B1 | 3/2002 | Wallet et al. | |
| 6,411,903 B2 | 6/2002 | Bush | |
| 6,438,493 B1 | 8/2002 | West et al. | |
| 6,466,923 B1 | 10/2002 | Young | |
| 6,473,696 B1 | 10/2002 | Onyia et al. | |
| 6,560,540 B2 | 5/2003 | West et al. | |
| 6,574,566 B2 | 6/2003 | Grismore et al. | |
| 6,594,585 B1 | 7/2003 | Gersztenkorn | 702/14 |
| 6,618,678 B1 | 9/2003 | Van Riel | |
| 6,625,541 B1 | 9/2003 | Shenoy et al. | |
| 6,662,112 B2 | 12/2003 | Eastwood et al. | |
| 6,708,118 B2 | 3/2004 | Stark | |
| 6,725,163 B1 | 4/2004 | Trappe et al. | |
| 6,735,526 B1 | 5/2004 | Meldahl et al. | |
| 6,757,614 B2 | 6/2004 | Pepper et al. | |
| 6,804,609 B1 | 10/2004 | Brumbaugh | |
| 6,847,895 B2 | 1/2005 | Nivlet et al. | |
| 6,850,845 B2 | 2/2005 | Stark | |
| 6,853,922 B2 | 2/2005 | Stark | |
| 6,941,228 B2 | 9/2005 | Toelle | |
| 6,950,786 B1 | 9/2005 | Sonneland et al. | |
| 6,957,146 B1 | 10/2005 | Taner et al. | |
| 6,970,397 B2 | 11/2005 | Castagna et al. | |
| 6,988,038 B2 | 1/2006 | Trappe et al. | |
| 7,162,463 B1 | 1/2007 | Wentland et al. | |
| 7,184,991 B1 | 2/2007 | Wentland et al. | |
| 7,188,092 B2 | 3/2007 | Wentland et al. | |
| 7,222,023 B2 | 5/2007 | Laurent et al. | |
| 7,243,029 B2 | 7/2007 | Lichman et al. | |
| 7,248,258 B2 | 7/2007 | Acosta et al. | |
| 7,248,539 B2 | 7/2007 | Borgos et al. | |
| 7,257,419 B2 | 8/2007 | Hunzinger | |
| 7,295,706 B2 | 11/2007 | Wentland et al. | |
| 7,295,930 B2 | 11/2007 | Dulac et al. | |
| 7,308,139 B2 | 12/2007 | Wentland et al. | |
| 7,453,767 B1 | 11/2008 | Padgett | |
| 7,463,552 B1 | 12/2008 | Padgett | |
| 2003/0200030 A1 | 10/2003 | Meldahl et al. | |
| 2005/0171700 A1 | 8/2005 | Dean | |
| 2005/0288863 A1 | 12/2005 | Workman | |
| 2006/0184488 A1 | 8/2006 | Wentland | |
| 2006/0190181 A1 | 8/2006 | Deffenbaugh et al. | 702/14 |
| 2007/0038691 A1* | 2/2007 | Candes et al. | 708/400 |
| 2007/0043458 A1 | 2/2007 | Pinnegar | 700/94 |
| 2007/0223788 A1 | 9/2007 | Pinnegar et al. | 382/109 |
| 2007/0299613 A1* | 12/2007 | Pinnegar et al. | 702/14 |

FOREIGN PATENT DOCUMENTS

| | | |
|---|---|---|
| WO | WO 98/25161 | 6/1998 |
| WO | WO 99/64896 | 12/1999 |
| WO | WO 01/84462 | 11/2001 |
| WO | WO 2004/008338 | 1/2004 |
| WO | WO 2006/064239 | 6/2006 |
| WO | WO 2007/006145 | 1/2007 |

OTHER PUBLICATIONS

Monsen, E. et al. (2001) "Seismic Texture Classification by Hidden Markov Tree Modeling of the Complex Wavelet Transform," *Norwegian Signal Processing Symposium*, Trondheim, Norway, 6 pgs.

Monsen, E. et al. (2002) "Seismic Texture Analysis by Curve Modeling With Applications to Facies Analysis," *SEG Expanded Abstracts* 21, 4 pgs.

Nguyen, T. T. et al. (2006) "A Shift-Invariant Multiscale Multidirection Image Decomposition," *IEEE International Conference on acoustics, speech, and signal processing*, vol. 2, pp. 153-156.

Selesnick, I. W. et al. (2005) "The Dual-Tree Complex Wavelet Transform," *IEEE Signal Processing Magazine* 22, pp. 123-151.

Starck, J. L. et al. (2002) "The Curvelet Transform for Image Denoising," *IEEE Transactions on Image Processing*, 11, pp. 670-684.

Starck, J. L. et al. (2006) "Wavelets, Ridgelets and Curvelets on the Sphere," *Astronomy & Astrophysics*, manuscript No. aa 3246-05, pp. 1191-1204.

Tibshirani, (1996) "Regression Shrinkage and Selection Via the LASSO," *J. Royal Statist. Soc B*. 58(1), pp. 267-288.

Tropp, J. A. et al. (2005) "Signal Recovery from Random Measurements via Orthogonal Matching Pursuit." 9 pgs., Submitted for publication, Apr. 2005. Revised, Nov. 2006. Download: (http://www-personal.umich.edu/~jtropp/papers/TG06-Signal-Recovery.pdf).

van Spaendonck (1999) "Directional Scale Analysis for Seismic Interpretation," *SEG Expanded Abstracts*, pp. 1844-1847.

van Spaendonck (2000) "Non-Redundant Directionally Selective Complex Wavelets," *International Conference on Image Processing*, pp. 379-382.

van Spaendonck (2002) "Seismic Applications of Complex Wavelet Transforms," *Delft University of Technology*, ISBN No. 90-9015810-3.

White, R. E. (1991) "Properties of Instantaneous Seismic Attributes," *The Leading Edge*, 10, pp. 26-32.

Yarham C. et al. (2006) "Curvelet-Based Ground Roll Removal," *76th SEG Annual Meeting, Expanded Abstracts*, SPNA 1.7, pp. 2777-2782.

"Interpolation," (2006) Wikipedia contributors, Wikipedia, The Free Encyclopedia (http://en.wikipedia.org/w/index.php?title=interpolation&oldid=82562556).

Candes, E. et al. (1999) "Curvelets—A Surprisingly Effective Nonadaptive Representation for Objects with Edges," *Curve and Surface Fitting:Saint-Malo 99*, pp. 105-120, L. L. Schumaker et al. (ed's), Vanderbilt University Press, Nashville, TN.

Daubechies I. et al. (2004) "An Iterative Thresholding Algorithm for Linear Inverse Problems With a Sparsity Constraint," *Communications on pure and applied mathematics* 57, pp. 1413-1457.

Do, M. N. et al. (2005) "The Contourlet Transform: an Efficient Directional Multiresolution Image Representation," *IEEE Transactions Image on Processing*, 14, pp. 2091-2106.

Duda, R. O. et al. (2000) *Pattern Classification* ($2^{nd}$ Edition), Chapters 3.8.1, 4.3.5, 5.11, 6.6.1, 10.13.1, 10.13.2 and 10.13.3, Wiley-Interscience.

Efron et al. (2004) "Least Angle Regression", *Ann. Statist*. 32(2), pp. 407-499 (Part 1 of 2).

Efron et al. (2004) "Least Angle Regression", *Ann. Statist*. 32(2), pp. 407-499 (Part 2 of 2).

Freeman, W. et al. (1991) "The Design and Use of Steerable Filters," *IEEE Pattern Analysis and Machine Intelligence* 13, pp. 891-906.

Hennenfent, G. et al. (2005) "Sparseness-Constrained Data Continuation With Frames: Applications to Missing Traces and Aliased Signals in 2/3-D," $75^{th}$ *SEG Annual Meeting, Expanded Abstracts*, pp. 2162-2165.

Hennenfent, G. et al. (2006) "Seismic Denoising With Nonuniformly Sampled Curvelets," *Computing in Science and Engineering* 8, pp. 16-25.

Herrmann, F. J. et al. (2004) "Curvelet-Domain Multiple Elimination With Sparseness Constraints," $74^{th}$ *SEG Annual Meeting, Expanded Abstracts*, 4pgs.

Lu, Y. M. et al. (2007) "Multidimensional Directional Filter Banks and Surfacelets," *IEEE Transactions on Image Processing* 16, pp. 918-931.

Luo, Y. et al. (1996) "Edge Detection and Stratigraphic Analysis Using 3D Seismic Data," *SEG Exp. Abstracts*, pp. 324-327.

Mallat, S. (1998) *A Wavelet Tour of Signal Processing*, Academic Press, pp. 409, 441-446.

Marfurt, K. J. et al. (1998) "3D Seismic Attributes Using a Running Window Semblance-Based Algorithm," *Geophysics*, 63, No. 4, pp. 1150-1165.

Marfurt, K. J. (2006) "Robust Estimates of 3D Reflector Dip and Azimuth," *Geophysics* 71, No. 4, pp. P29-P40.

Matlab and C++ (2005) at www.curvelet.org Curvelab Toolbox, v. 2.0, 4 pgs.

Meyer, D. E. et al. (2001) "Use of Seismic Attributes in 3-D Geovolume Interpretation," *The Leading Edge*, 20, pp. 1377-1381.

Moghaddam, P. P. et al. (2004) "Migration Preconditioning With Curvelets," *74th SEG Annual Meeting, Expanded Abstracts*, pp. 2204-2207.

Bahorich, M. et al. (1995) "3-D Seismic Discontinuity for Faults and Stratigraphic Features; The Coherence Cube," *The Leading Edge*, 14(10), pp. 1053-1058.

Barnes, A. E. (1992) "The Calculation of Instantaneous Frequency and Instantaneous Bandwidth," *Geophysics*, 57, No. 11, pp. 1520-1524.

Barnes, A. E. (1996) "Theory of 2-D Complex Seismic Trace Analysis," *Geophysics*, 61, No. 1, pp. 264-272.

Bednar, J. B. (1998) "Least Squares Dip and Coherency Attributes," *The Leading Edge*, 17, p. 777-778.

Candes, E. et al. (2005) "Fast Discrete Curvelet Transforms," *SIAM Multiscale Model. Simul.* 5, No. 3, 44 pgs.

Castagna, J. P. et al. (2006) "Comparison of Spectral Decomposition Methods," *First Break*, 24, pp. 75-79.

Castagna, J. P. et al. (2003) "Instantaneous Spectral Analysis: Detection of Low-Frequency Shadows Associated With Hydrocarbons," *The Leading Edge*, pp. 120-127.

Chopra, S. et al. (2005) "Seismic Attributes—A Historical Perspective," *Geophysics*, 70, No. 5, pp. 3SO-28SO.

Douma, H. et al. (2005) "On Common-Offset Prestack Time Migration With Curvelets," *75th SEG Annual Meeting, Expanded Abstracts*, SPMI P1.3, pp. 2009-2013.

Eastwood, J. (2002) "Introduction—The Attribute Explosion," *The Leading Edge*, 21, pp. 994.

Starck, J.-L. (2005), "Wavelets, ridgelets and curvelets on the sphere," *Astronomy & Astrophysics* manuscript No. aa3246-05, pp. 1-17.

*International Search Report & Written Opinion*, dated Sep. 12, 2008, PCT/US08/06949.

* cited by examiner

GEOLOGIC FEATURES FROM CURVELET BASED SEISMIC ATTRIBUTES

CROSS REFERENCE TO RELATED APPLICATIONS

This application is a National Stage entry under 35 U.S.C. 371 of PCT/US2008/06949 that published as WO 2009/011735 and was filed on Jun. 2, 2008 and claims the benefit of now expired U.S. Provisional application 60/959,653 which was filed on Jul. 16, 2007.

FIELD OF THE INVENTION

This invention relates generally to the field of geophysical prospecting and more particularly to the analysis of multi-dimensional data, for example, seismic data. Specifically, this invention describes a new analysis technique to develop useful attributes for data interpretation by either humans or computer-based algorithms.

BACKGROUND OF THE INVENTION

In seismic data, certain geologic features that may not be easy to identify are known to facilitate the discovery of hydrocarbons. These features may be characterized by sub-features or sets of sub-features that are distributed across multiple seismic volumes. For example, seismic reflection data can be used to reconstruct the earth's subsurface structure. Some of these structures may be suitable for trapping fluids such as oil/water or gas. The source to receiver separation-related changes in the amplitude of the reflections from a structure may indicate the type of accumulation (oil/water/gas) in the structure. Currently industry practice is to calculate multi-dimensional (e.g., point, surface, volume, temporal) seismic attributes (i.e., measurements based on seismic data) by using multiple techniques and representations of the data. These attributes aid humans or computer algorithms to interpret and/or identify geological/geophysical features of the data. A severe limitation is that critical attribute interdependencies are not captured during the processes of conventional attribute generation. This limitation arises from the use of different data representations and calculation techniques to generate the attributes; e.g. some attributes are obtained using single trace calculations, whereas others are obtained by operating on multiple traces. (A trace is a record of seismic signal amplitude detected by a single receiver or array of receivers as a function of time.)

Feature Detection Using Current Attribute Extraction Methods

This section reviews conventional approaches to extract attributes. Extraction of attributes from seismic data is a mature area. Local amplitude, phase, frequency, dip, and discontinuity are some of the important, well-studied seismic attributes. Such attributes are then used to facilitate manual or automatic recognition of desired geologic features in seismic data.

The methods used to generate attributes can differ significantly. For example, local frequency, amplitude, and phase attributes are extracted by analyzing each trace separately, whereas dip and discontinuity attributes are extracted by analyzing multiple traces. Due to differences in the attribute generation methods employed, conventional techniques suffer from fundamental limitations including:

1. Conventionally generated attribute volumes can contain a lot of redundant information. For example, peak amplitude and mean-squared amplitude attribute volumes are known to be highly correlated (Barnes, 2006). Such redundant "information" generation not only wastes computational and storage resources, but more importantly overwhelms the end user, thereby resulting in degraded efficiency and missed prospecting opportunities.
2. Each conventional attribute generation method has a different sensitivity to noises in the input datasets. Consequently, the relative quality of generated attribute volumes can differ significantly. Such uncertainty can overwhelm the end user.

The following sub-sections describe conventional methods to extract routinely used attributes such as local frequency, dip, local amplitude, phase, and discontinuity attributes. In contrast, it will be illustrated later how these attributes can be extracted from the data's curvelet representation by the present inventive method.

Local amplitude and phase attribute: Seismic data typically displays continuity and smooth amplitude and phase content variation across multiple traces. Local amplitude attribute describes how the magnitude of a signal varies across seismic data. Local phase attribute describes how the phase of a signal varies across seismic data. Local amplitude and phase are also referred to as instantaneous amplitude and phase respectively.

The conventional approach computes the analytic (complex-valued) signal separately for each trace in the data set. Such an approach is commonly called complex trace analysis. The magnitude and phase of the computed analytic signal provides the trace's local amplitude and phase attribute respectively. The analytic signal is computed using the one dimensional (1-D) Fourier transform or Hilbert transform.

A key limitation of all conventional local amplitude and phase extraction methods stems from analyzing each trace separately. This approach can create significant additional noise because the individual decompositions are not required to honor the typically smoothly varying amplitude and phase content of seismic reflectors across multiple traces.

Local frequency attribute: Local frequency attribute describes how the local frequency content of a signal varies across seismic data. Local frequency attribute extraction is also referred to as time-frequency representation ("TFRs"), spectral decomposition, or instantaneous frequency. A variety of TFRs such as the short-time Fourier transforms ("STFT"), Wigner-Ville Distribution ("WVD"), adaptive TFRs, complex trace-based methods and Instantaneous Spectral Analysis ("ISA") have been proposed in literature.

Similar to the conventional local amplitude and phase attributes, conventional local frequency attributes are noisy because the methods analyze each trace separately. An additional limitation of such methods is that the frequency of the seismic data is measured along the direction of a trace. Such a frequency estimate is a useful attribute for flat reflectors. For dipping reflectors, a more useful and physically meaningful attribute is the frequency that is measured in the normal direction to the dip of the reflector because this value more accurately measures the contrast in rock property distribution. To measure the reflector frequency in the normal direction to the dip, it is essential to jointly analyze multiple adjacent traces. Consequently, conventional methods are incapable of accurately measuring the desired local frequency of dipping reflectors (a problem that is solved by the present inventive method).

Dip attribute: This attribute describes the geometric orientation of reflectors in a two dimensional seismic image. Given a reflector in a seismic image, the dip of the reflector at any location is the orientation of the tangent to the reflector with respect to the horizontal. In higher-dimensional seismic volumes, several parameters are necessary to fully describe a reflector's geometric orientation; for example, in three dimensions, the two parameters, commonly referred to as dip and azimuth, are needed to describe a reflector's geometric orientation. For convenience, but without loss of any generality, this document will collectively refer to attributes describing a reflector's geometric orientation as dip.

One class of traditional approaches applies complex trace analysis on individual traces and then calculates the dip. Such approaches can estimate a single average dip at each location. Clearly, such an average dip is not useful when the underlying data contain several events with conflicting dips. Further, such an analysis does not provide the strength of the event containing such a dip. Another class of approaches scans a discrete number of dips at each location in the seismic volume and measures the strength of each dip by computing the local correlation of the data with a plane that has the specified dip. Marfurt ("Robust estimates of 3D reflector dip and azimuth," *Geophysics* 71, 29-40 (2006)) further improves upon such dip estimates by performing the dip search over multiple shifted windows. Such approaches can only provide a dip strength that is essentially averaged over all frequencies. Clearly, such average dip strengths are not useful when the underlying data contain events with different frequency content and conflicting dips.

Discontinuity attribute: Discontinuity attribute is closely related to dip attribute because it quantifies rapid changes along the dip direction. Discontinuity attribute is typically used to emphasize fault features or stratigraphic boundaries in seismic data. This attribute is often used interchangeably with the coherence attribute. All conventional discontinuity attributes are based on computing local cross-correlations, as described in U.S. Pat. No. 5,563,949. Such methods are also computationally expensive and can be sensitive to the noises in seismic data.

Background of Enabling Tools

First, this section provides background information about a well known mathematical tool used in the present invention called the curvelet transform. Second, this section reviews known applications of curvelets in the area of geology and geophysics (including one known instance of a curvelet-based attribute extraction), and points out some of their limitations.

Curvelets: A Multi-Resolution Directional Transform

Curvelet transforms are recently developed mathematical tools that represent an m-dimensional signal (m>1) signal using a linear, weighted combination of special elementary functions.

$$\text{signal}(x_1, x_2, \ldots, x_m) = \sum_i weights_i \times elementary\_functions_i(x_1, x_2, \ldots, x_m) \quad (1)$$

$$\text{signal}(x_1, \ldots, x_m) = \text{real}\left(\sum_i weights_i \times curvelet\_elementary\_fns_i(x_1, \ldots, x_m)\right) \quad (1a)$$

Figure 1:
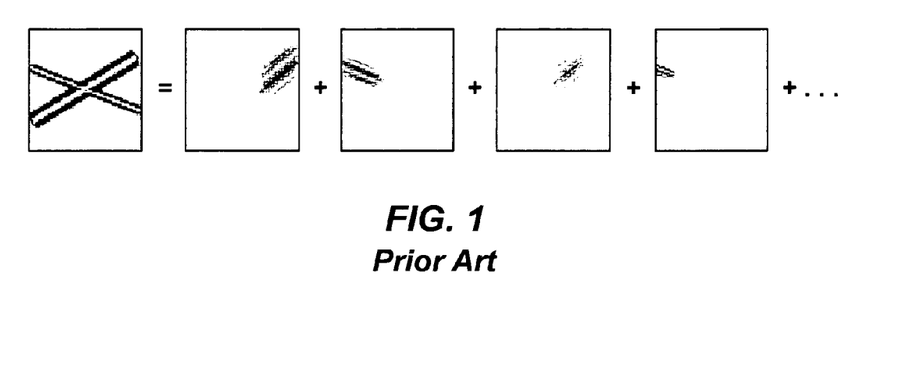
FIG. 1 illustrates a synthetic image, which comprises two intersecting reflectors, and its representation as a sum of weighted curvelet elementary functions.

For example, FIG. 1 illustrates a synthetic image, which comprises two intersecting reflectors and its representation as a sum of weighted curvelet elementary functions. For illustration purposes, only four curvelet elementary functions are shown. Alternatively, curvelet transforms can also express an m-dimensional signal as $$\text{signal}(x_1, \ldots, x_m) = \text{real}\left(\sum_i complex\_weights_i \times complex\_elementary\_fns_i(x_1, \ldots, x_m)\right) \quad (2)$$

Due to the properties of the elementary basis functions (similar to real and imaginary parts of an analytic signal), the complex valued representation in Equation (1) can be transformed into Equation (2) and vice versa with simple manipulations on the equation weights. For example, the implementation in the Curvelab Software Package, available for download in Matlab and C++ at www.curvelet.org (2005), provides an option to compute the complex-valued curvelet transform, which is equivalent to the representation in Equation (2).

Figure 2:
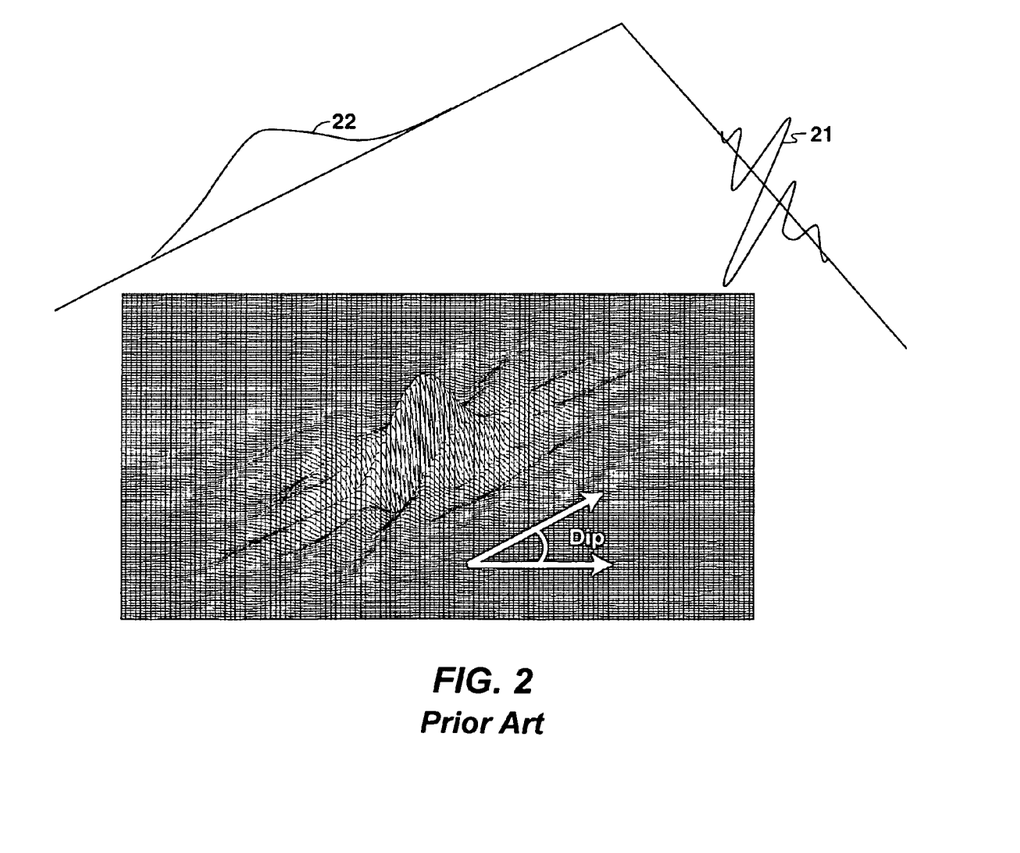
FIG. 2 illustrates the mesh view of a 2-D curvelet elementary function showing the function's anisotropy.

Properties of curvelet elementary functions: Curvelet transforms provide desirable representations for seismic data due to multi-resolution and directional properties of the elementary functions. As illustrated in FIG. 2, the elementary functions are highly oscillatory in one direction (referred to as the oscillatory direction henceforth), with the function's cross-section 21 in the oscillatory direction resembling a windowed sinusoid. Since the oscillations in different elementary functions can occupy different frequency bands (which is a resolution measure), the transform is said to possess multi-resolution properties. The transform is said to possess directional properties because the elementary functions are not isotropic. They vary more slowly (i.e., contain slower frequency oscillations) and smoothly in the directions orthogonal to the oscillatory direction; the function's cross section 22 in the orthogonal direction resembles a Gaussian window. Each elementary function is spatially localized because its amplitude rapidly decays to zero outside a certain region. The region that essentially localizes an elementary function resembles an oriented needle in two dimensions (2-D) and a disc in three dimensions (3-D). The location, oscillation frequency, and oscillatory direction of each elementary function can be decoded from its index i in Equation (1) or (2) because the functions are ordered. Due to the listed properties of the elementary functions, the curvelet transform belongs to the class of multi-resolution directional transforms (see, for example, U.S. Patent Application Publication US 2007/0038691).

Obtaining curvelet representations (Equations (1) or (2)): A given dataset's curvelet representation is not unique because the number of curvelet elementary functions exceeds the number of points in seismic data. Various curvelet representations differ in their choices of weights in Equation (2).

The most common curvelet representation is obtained by taking the forward curvelet transform of a given dataset. The forward curvelet transform can be implemented by employing a variety of steps that will be familiar to one versed in the multi-resolution directional transforms area (see, for example, Candes, et al., "Fast discrete curvelet transforms," *SIAM Multiscale Model. Simul.* 5, no. 3, 861-899 (2006, published online in July 2005)). Some key steps comprise taking the multidimensional Fourier transform, windowing the Fourier coefficients into annuli (termed subbands or scales sometimes) with dyadic widths, further subdividing the annuli into angular wedges, and finally taking inverse Fourier transforms (see the Candes, et al. article referenced in the preceding sentence for details).

An alternate curvelet representation that employs a sparse set of weights in Equation (2) can be obtained by employing minor variations of the iterative method described in Daubechies et al., "An iterative thresholding algorithm for linear inverse problems with a sparsity constraint," *Communications on pure and applied mathematics* 57, 1413-1457 (2004):

a. Compute an initial estimate of the weights by employing the forward curvelet transform.
b. Process the weights by shrinking (see hard thresholding and soft thresholding, for example, in Mallat, *A Wavelet Tour of Signal Processing*, Academic Press, 441-446 (1998)) the weights, thereby leaving the large weights relatively untouched.
c. Compute the error between the original signal and the signal represented by the processed weights.
d. Compute the weights for the error signal (similar to step (a)).
e. Add the error signal weights to the processed weights in step (b) to create an updated set of processed weights.
f. Go to step (b) and iterate.

Curvelet representations with a sparse set of weights can also be computed by employing iterative techniques such as Matching Pursuit and Orthogonal Matching Pursuit (see Tropp and Gilbert, "Signal recovery from random measurements via Orthogonal Matching Pursuit." Submitted for publication, April 2005. Revised, November 2006. Download: (http://www-personal.umich.edu/~jtropp/papers/TG06-Signal-Recovery.pdf); Basis pursuit (see the previously mentioned Mallat, A Wavelet Tour of Signal Processing, pg. 409); LASSO (see Tibshirani, "Regression shrinkage and selection via the LASSO," J. Royal. Statist. Soc B. 58(1), 267-288 (1996)); LARS (see Efron et al., "Least Angle Regression", Ann. Statist. 32(2), 407-499 (2004)); and expectation-maximization, Bayesian estimation algorithms, belief propagation or similar techniques referenced in these publications.

Alternatives to curvelet transforms: The discussion above has dealt with the curvelet transform. However, several other multi-resolution directional transforms such as the 2-D and 3-D complex wavelet transform (Selesnick et al., "The Dual-Tree Complex Wavelet Transform," *IEEE Signal Processing Magazine* 22, 123-151 (2005)); the 2-D contourlet transform (Do and Vetterli, "The contourlet transform: an efficient directional multiresolution image representation," *IEEE Transactions Image on Processing*, 14, 2091-2106 (2005); Nguyen and Oraintara, "A Shift-Invariant Multiscale Multi-direction Image Decomposition," 2006 IEEE International conference on acoustics, speech, and signal processing. Volume 2); and the 3-D surfacelet transform (Lu and Do, "Multidimensional Directional Filter Banks and Surfacelets," *IEEE Transactions on Image Processing* 16, 918-931 (2007)) provide data representations that share the properties and strengths of curvelet representations. Steerable pyramids (Freeman W. and Adelson R., 1991, "The design and use of steerable filter," *IEEE Pattern Analysis and Machine Intelligence* 13, 891-906.) are another example of transforms that possess multi-resolution and directional properties. These alternate multi-resolution directional transforms can be substituted for curvelet transforms in some applications.

Currently available implementations for curvelets (for example, Curvelab Software Product) make fixed choices for the windows, the dyadic widths of the annuli, and number of wedges based on theoretical considerations. A person skilled in the area of multi-resolution directional transforms would recognize that a curvelet-like multi-resolution directional transformation can also be implemented by varying the windows employed (e.g., use Hamming windows instead of Meyer windows), the annuli widths (e.g., not necessarily dyadic), and the number of wedges. For example, the previously mentioned contourlets in 2-D and surfacelets in 3-D choose the windows, annuli, and wedges differently from the curvelet transform (Curvelab).

Further, current implementations such as the Curvelab product employ the multidimensional Fourier transform to compute the forward curvelet transform. A person skilled in the area of multi-resolution directional transforms would recognize that curvelet-like multi-resolution directional transformations could also be implemented via equivalent computational operations in the data domain. For example, the previously mentioned complex wavelet transform, the contourlets in 2-D, and the surfacelets in 3-D can all be implemented by performing computations in the data domain.

Applications of Curvelets and Related Transforms

Geophysical data processing: Curvelets have found several successful applications in enhancing the resolution of a geophysical dataset. Recently, Herrmann and Verschuur ("Curvelet-domain multiple elimination with sparseness constraints," 74*th SEG Annual Meeting, Expanded Abstracts* (2004)) and Yarham et al., "Curvelet-based ground roll removal," 76*th SEG Annual Meeting, Expanded Abstracts*, SPNA 1.7 (2006)) attenuated undesirable water bottom multiples and ground roll noise, respectively, from seismic data by appropriately attenuating the data's curvelet transform coefficients. Moghaddam and Herrmann ("Migration preconditioning with curvelets," 74*th SEG Annual Meeting, Expanded Abstracts*, 2204-2207, (2004)) and de Hoop and Douma ("On common-offset prestack time migration with curvelets," 75*th SEG Annual Meeting, Expanded Abstracts*, SPMI P1-3 (2005)) employ curvelet transforms to improve the resolution of migrated seismic data. Hennenfent and Herrmann ("Sparseness-constrained data continuation with frames: Applications to missing traces and aliased signals in 2/3-D," 75*th SEG Annual Meeting, Expanded Abstracts* (2005)) use curvelets to recover higher resolution, interpolated geophysical data. These curvelet-based data enhancement methods are unrelated to the technical problem addressed herein because they apply curvelet transform to problems that are fundamentally different from the identification of geologic patterns from seismic data.

Curvelet-based seismic texture classification: Two papers (Monsen and Odegard, "Seismic texture analysis by curve modeling with applications to facies analysis," *SEG Expanded Abstracts* 21, 617 (2002); and Monsen et al., "Seismic Texture Classification by Hidden Markov Tree Modeling of the Complex Wavelet Transform," Norwegian Signal Processing Symposium, Trondheim, Norway (October 2001)) describe the limited use of complex wavelets and contourlets respectively to calculate two specific textural attributes (parallel and chaotic) of a two-dimensional seismic image. The textural attributes are then used to classify a two-dimensional image. The classifications presented in both papers are based on the statistics of the seismic data's complex wavelet and contour representation weights. Monsen et al. (2001) use a hidden Markov model on the data's complex wavelet coefficients to perform the classification. Monsen and Odegard (2002) base their classification on a simpler statistical model, which assumes that the data's contourlet representation weights in different sub-bands and angular wedges are independent. The authors speculate that the technique could be extended to 3-dimensional problems.

PCT International Publication No. WO 2006/064239 A1 discloses a complex wavelet-based method to identify features within a dataset. The method uses a complex-valued multiscale transform such as the complex wavelet transform. This work applies a complex-valued multiscale transform to a target dataset and a candidate dataset, and then uses the phase differences between coefficients of the two datasets to generate a measure of match. This measure is subsequently used to accept or reject a hypothesis that the target is present. No attributes or their interdependencies are extracted or retained from the complex-valued multiscale representation of the data.

In a patent application publication (US 2007/0223788 (pub. date Sep. 27, 2007); CA 2571094 (pub. date Jun. 13, 2007)), Pinnegar et al. disclose a method to compute frequency-dependent dip or amplitude maps by processing multidimensional data using space-frequency or time-space-frequency transforms. The maps are constructed from dominant features that correspond to the largest value of the transform coefficients. These attributes are created to assist in the interpretation of geologic features from seismic data. The authors suggest that the curvelet transform (a space-frequency transform) can be used to create the attribute maps.

In another patent application publication (US 2007/0043458 (published on Feb. 22, 2007); WO 2007/006145 (published on Jan. 18, 2007)), Pinnegar discloses a method for processing time-varying three component signals to determine polarization dependent attribute maps. The attribute maps are determined by transforming each of the three components to a time-frequency domain. The author focuses on using the S-transform to construct the attribute maps, and suggests that the curvelet transform can be used instead of the S-transform.

In a Ph.D. thesis ("Seismic applications of complex wavelet transforms," Delft University of Technology, 2002, ISBN number 90-9015810-3) and another publication ("Non-redundant directionally selective complex wavelets," 2000 International conference on image processing, pages 379-382), van Spaendonck describes the use of a complex wavelet transform to compute dip and frequency (scale) seismic volume attributes. In another paper ("Directional scale analysis for seismic interpretation", *SEG Expanded Abstracts* 1844-1847 (1999)), van Spaendonck describes the application of steerable pyramids to compute dip and frequency (scale) seismic volume attributes.

What is needed is an expansive use of a more powerful transform such as the curvelet transform to develop new seismic data attributes that the user may decide upon (not limited to specific attributes such as the chaotic and parallel textural attributes) such as (without limitation) local frequency, dip, local amplitude, phase, and discontinuity, and preserve interdependencies between multiple attributes. The present invention satisfies this need.

SUMMARY OF THE INVENTION

A method is disclosed for identifying geological features of a subsurface region from geophysical data gathered from the region, said method comprising: (a) selecting a curvelet transform and a corresponding basis set of elementary functions ("curvelet functions"), wherein the term curvelet transform also includes the contourlet and surfacelet transforms; (b) transforming the geophysical data into a curvelet representation of the data using the selected basis set and transform, wherein the geophysical data are represented as a series expansion of curvelet functions each multiplied by a corresponding expansion coefficient ("weight"); (c) extracting one or more geophysical attributes from the curvelet representation of the geophysical data; and (d) identifying geologic features from the one or more extracted attributes.

In some embodiments of the invention, the curvelet transform is a complex curvelet transform, with complex curvelet functions and weights. In some embodiments of the invention, the curvelet representation of the geophysical data employs a sparse set of weights in the curvelet expansion. In some embodiments of the invention, the geologic features are identified directly from the weights and computed geophysical attributes of the curvelet functions. In other embodiments of the invention, an intermediate data volume is created for each extracted attribute and used to identify the geologic features.

BRIEF DESCRIPTION OF THE DRAWINGS

The present invention and its advantages will be better understood by referring to the following detailed description and the attached drawings in which.

An attempt is made to use the same reference number when the same feature appears in more than one drawing. The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF PREFERRED EMBODIMENTS

The present invention uses a recently developed mathematical data representation known as the curvelet transform (Candes et al., "Methods for performing fast discrete curvelet transforms of data," U.S. Patent Application Publication US 2007/0038691 (2007); and Candès and Donoho, "Curvelets—A Surprisingly Effective Nonadaptive Representation for Objects with Edges," *Curve and Surface Fitting:Saint-Malo* 99, pgs 105-120, L. L. Schumaker et al. (ed's), Vanderbilt University Press, Nashville, Tenn. (2000)) to calculate novel attributes in a fully consistent multi-trace approach spanning multiple spatial dimensions and frequencies. Using this approach, a given seismic data volume is represented as a weighted sum of curvelet functions. The combination of this data representation and application of consistent algorithms to jointly calculate important novel attributes while preserving their interdependencies (e.g., dips at specific frequencies) forms the basis of the present invention. Conventional methods cannot capture the interdependencies between the different attributes. For example, given conventional dip and frequency attribute volumes, it is not possible to identify the dip of seismic events with an arbitrary frequency. The present inventive method captures high-resolution attribute interdependencies and uses them to identify geologic features. Although seismic data examples are used throughout the description of the invention, that is for illustrative purposes only. The present inventive method is not limited to seismic data and may be applied to any subsurface geophysical 2-D or 3-D data set and its attributes, e.g. controlled source electromagnetic data.

Figure 3:
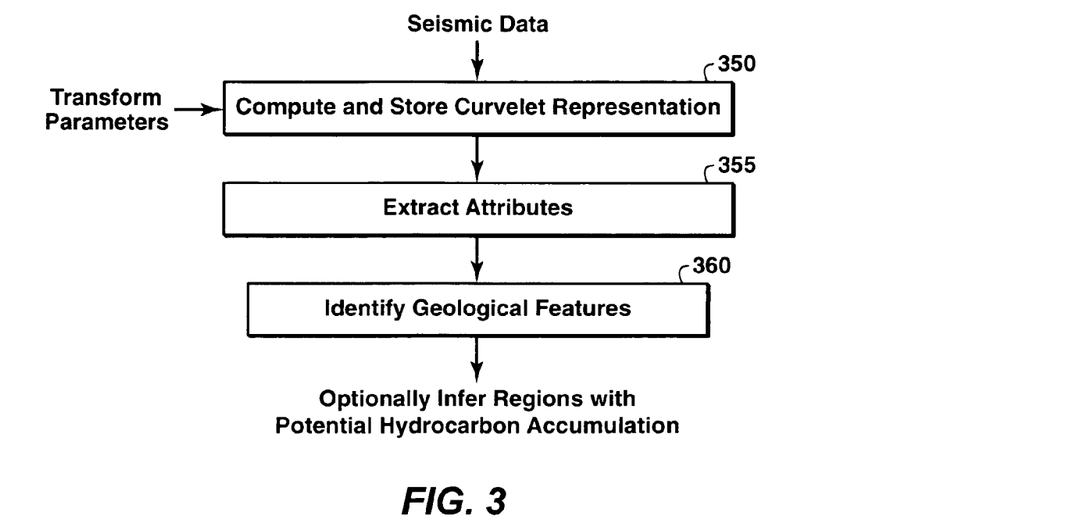
FIG. 3 is a flow chart describing basic steps in the present inventive method.

FIG. 3 shows basic steps in the present inventive method. At step 350, a given geophysical data volume is first expressed as a weighted sum of curvelet functions as in Equation (2); this may be called a curvelet representation of the data. Then, certain algorithms that exploit the properties of curvelet representations are used to generate new attributes (step 355). This approach for generating attributes preserves the attributes' interdependencies, because the curvelet representation (Equation (2)) serves as the common source for all of the generated attributes. The combination of curvelet representations and consistent attribute generation algorithms is a central feature of the invention. At step 360, the interdependent attribute data volumes are jointly interpreted to identify geologic features that may imply regions with hydrocarbon accumulation. In one embodiment of the invention, a single attribute is extracted at step 355. Obviously no attribute interdependencies are extracted in this embodiment, and the feature identification in step 360 is based on just the one attribute.

Besides the curvelet transform, certain curvelet-like transforms may be selected at step 350 and used in the present inventive method. Those include the 2-D contourlet transform and the 3-D surfacelet transform. Even though they are also transforms that possess multi-resolution and directional properties, complex wavelet transforms and steerable pyramids are not suitable for the present inventive method. Both of these transforms have significant drawbacks as compared to curvelets. Steerable pyramids use an undesirably large number of elementary functions compared to the number of points in seismic data. The number of elementary functions used (commonly referred to as the transform's redundancy) in representing the data scales increases linearly with the number of angular wedges. The high redundancy implies that for typical datasets, data representation (as needed for feature recognition) with steerable pyramids may be computationally prohibitive. In addition, with hugely redundant transforms such as steerable pyramids, features in the dataset may be represented by several elementary functions of equal significance (in terms of the representative weights in equation (1)). Consequently, a steerable pyramid transform does not facilitate convenient identification of features in a dataset. In contrast to steerable pyramids, curvelets have lower redundancy, which makes them more appropriate (due to lower computer memory requirements and better discriminative power) for geologic feature identification. Complex wavelets, on the other hand, use elementary functions with limited number (six) of directions. In contrast to complex wavelets, curvelets have higher directional resolution, thereby enabling more accurate geologic feature identification. Applications of steerable pyramids-based and complex wavelets-based attribute extraction were described in the "Background" section. However, these transforms are not well suited for geologic feature identification due to the aforementioned drawbacks.

As stated, geologic feature identification performed with a complex wavelet transform is limited by the directional resolution of the transform. It is recognized that this key limitation can be overcome by any curvelet transform implementation (such as the implementation in the Curvelet Software Product, which employs dyadic annuli widths). However, complex-wavelet based geologic feature identification also suffers from limited frequency resolution (particularly at higher frequencies) due to the fixed choice of annuli widths associated with the transform. This limitation of complex wavelets restricts their ability to recognize some types of frequency-dependent geologic features. This frequency resolution limitation can be overcome by using curvelet transforms with variable annuli widths (not necessarily dyadic). The frequency resolution limitation and the directional resolution limitation cannot both be overcome using the complex wavelet transform. Common curvelet transform implementations, which employ dyadic annuli widths, overcome the angular limitation. To overcome the frequency limitation, curvelet transforms with variable annuli widths are necessary.

One embodiment of the present invention calculates separate but interdependent attribute volumes, which can subsequently be jointly interpreted by humans or computer algorithms to identify geological/geophysical features (see the flowchart of FIG. 4). As an example, new attribute volumes such as dip, frequency, amplitude, phase, discontinuity, and curvature volumes can be directly constructed from the curvelet representation of seismic data, and then viewed by the end user either directly or after application of pattern recognition methods. In contrast to all conventional local amplitude and phase extraction methods that analyze each trace separately, the curvelet-based method of the present invention returns less noisy attributes that honor the smooth amplitude and phase content variation across multiple traces. In addition, unlike all existing methods, the inventive method can more conveniently (for interpretation) and compactly convey key interdependencies such as dip, amplitude, or phase volumes at specific frequencies One approach to construct such attribute volumes and retain their interdependencies involves the following key step. Using the consistent curvelet-based framework, the attributes (e.g., dip and frequency) of each curvelet elementary function in Equation (2) are associated with the attributes (e.g., dip and frequency) of seismic data at the location of the curvelet elementary function. The amplitude distribution of seismic data components with such an attribute can then be inferred using the weights in Equation (2). These features help the interpreter to recognize geological/geophysical features. Thus, the consistent curvelet-based method of the present invention can construct attribute volumes such as dip and frequency volumes directly from the curvelet representation of seismic data and facilitate identification of geological and geophysical features, as in the steps of FIG. 4.

Figure 5:
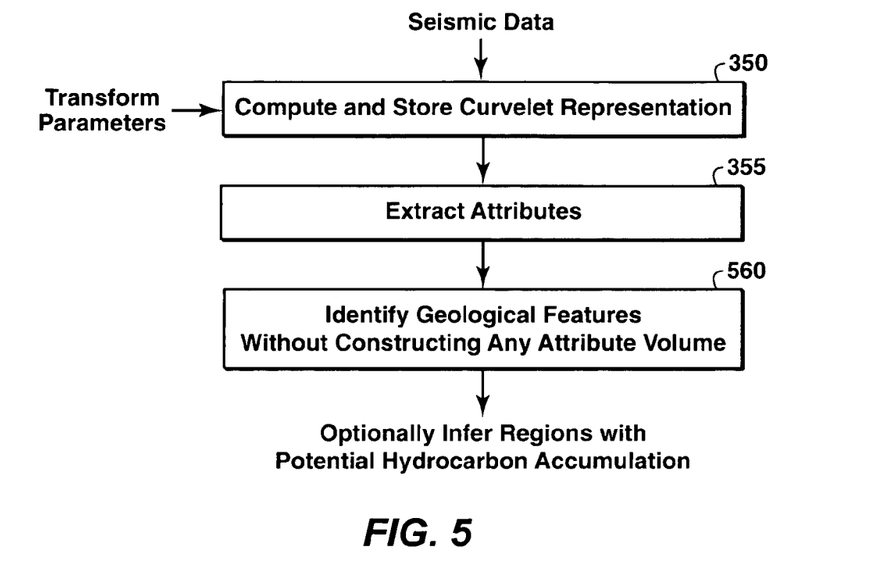
FIG. 5 a flow chart describing embodiments of the method of FIG. 3 in which geologic feature identification is made directly from the curvelet representation.

Another embodiment of the invention operates directly on a data volume containing the curvelet coefficients (e.g., the weights from equation (2)) without creating the attribute volumes (see the flowchart of FIG. 5). This embodiment is particularly efficient as the curvelet representation compactly expresses the information contained by several attributes.

These embodiments are described next in more detail.

Curvelet-Based Geologic Feature Identification

As described above, the curvelet representation of seismic data (Equation (2)) may be used to facilitate identification of geologic features. These features may subsequently assist in inferring regions with potential hydrocarbon accumulation. One embodiment of the method of FIG. 3 is presented in detail as follows:

1. Choose a 2-D or 3-D set of seismic data to be analyzed.
2. Pick a preferred implementation of the curvelet transform (e.g., using software such as Curvelab 2005). Alternatives include any of the following transforms for which references are given above: contourlets for 2-D data (Do and Vetterli, 2005; Nguyen and Oraintara, 2006), surfacelets for 3-D data (Lu and Do, 2007).
3. Specify the parameters required to compute the multi-resolution directional transform, such as the frequency annuli and the angle partitions, according to the resolution desired. For contourlets and the curvelet implementation in Curvelab, 2005, the frequency annuli widths maybe pre-selected. Represent the seismic data using either dyadic frequency annuli widths (as employed by Curvelab, 2005), or non-dyadic frequency annuli widths (see the previously cited Candes et al. 2005 paper).
4. Compute and store the curvelet representation (Equation (2)) for seismic data (step 350). A preferred approach employs an iterative technique that represents the data using a sparse set of weights such as described above under the heading Background of Enabling Tools.
5. Identify and extract desired attributes and their interdependencies from the data's curvelet representation (step 355). The attributes of individual curvelet elementary functions such as dip, frequency, and location are used along with their weights in Equation (2) during this step.
6. The extracted attributes, along with stored curvelet representation, can then be used by humans or computer algorithms to identify geologic/geophysical features (step 360).

Figure 4:
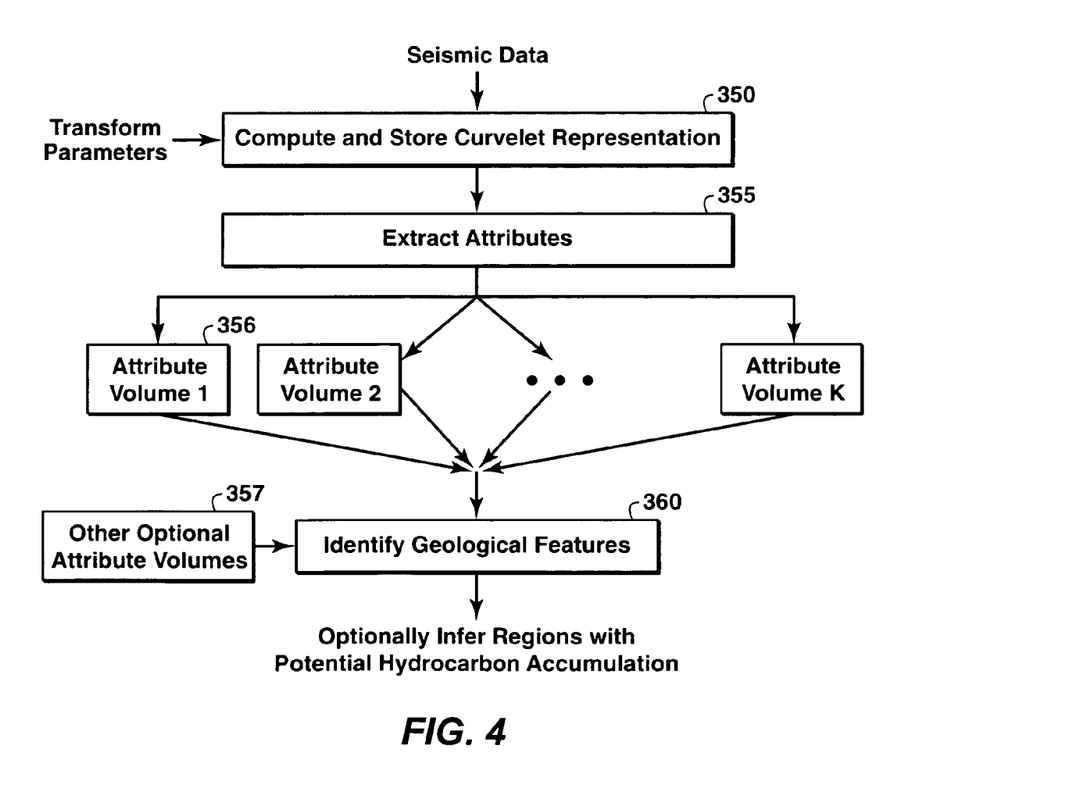
FIG. 4 is a flow chart describing embodiments of the method of FIG. 3 in which intermediate attribute volumes are created.

Curvelet-Based Geologic Feature Identification with Intermediate Attribute Volumes The result of step 355 can be used to create separate attribute volumes from the curvelet representation for subsequent use in identifying geologic features, as indicated by step 356 in FIG. 4. For example, many geologically meaningful attributes including dip, frequency, amplitude, phase, and discontinuity can be generated using the curvelet representation. Further, other attribute volumes that illustrate the interdependencies between any generated attributes such as dip volumes at specific frequencies can also be generated. Each curvelet-based attribute volume is generated by employing a series of steps, which are described for certain selected attributes in the examples given next below. These attribute data volumes, optionally supplemented by other conventional attribute volumes (step 357), can then be used by humans or computer algorithms to identify geologic features.

Following are descriptions of how the method of FIG. 4 may be applied in the context of certain specific, selected attributes.

Local Amplitude and Phase attribute: To generate these attributes, a complex-valued seismic volume is constructed from the real-valued input. This step involves muting a subset of weights in Equation (2) as described below.

1. Compute and store the curvelet representation (Equation (2)) for seismic data (step 350).
2. Extract desired attributes and their interdependencies from the data's curvelet representation (step 355). The following steps 3-5 comprise step 356 in FIG. 4.
3. Set a subset of weights in Equation (2) to zero. The curvelet expression (Equation (2)) for a real-valued input is such that the weights for elementary functions, which lie in angular wedges on the opposite sides of the origin in the multi-dimensional frequency domain, are complex conjugates of each other. The weights that are set to zero belong to elementary functions lying in a predetermined half-space of the Fourier domain.
4. Compute the inverse curvelet transform of the curvelet expansion resulting from step (3) to obtain a complex-valued volume.
5. The absolute value of the complex-valued volume from step (4) provides the local amplitude of the volume, indicated on FIG. 4 as Attribute volume 1. The phase of the complex-valued volume provides the local phase of the volume, indicated on FIG. 4 as Attribute volume 2.
6. The extracted attributes, along with stored curvelet representation, can then used to identify geologic features by humans or computer algorithms (step 360).

Figure 9A:
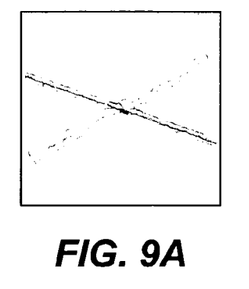
FIGS. 9A-C depict a test image (9A) and curvelet-based local amplitude (9B) and phase (9C) attributes.
Figure 9B:
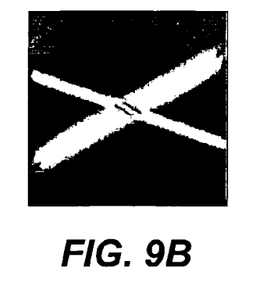
Figure 9C:
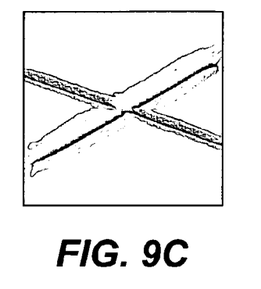

FIG. 9A depicts a test image (synthetic data), FIG. 9B the local amplitude, and FIG. 9C the phase attributes obtained using the steps described above.

Amplitude-Dip-frequency and Phase-Dip-Frequency attribute: The amplitude and phase of seismic events with specific dip and frequency values can be computed from the data's curvelet representation (Equation (2)) using the steps described below. The generated attribute captures the interdependencies between amplitude/phase, dip, and frequency.

Figure 7:
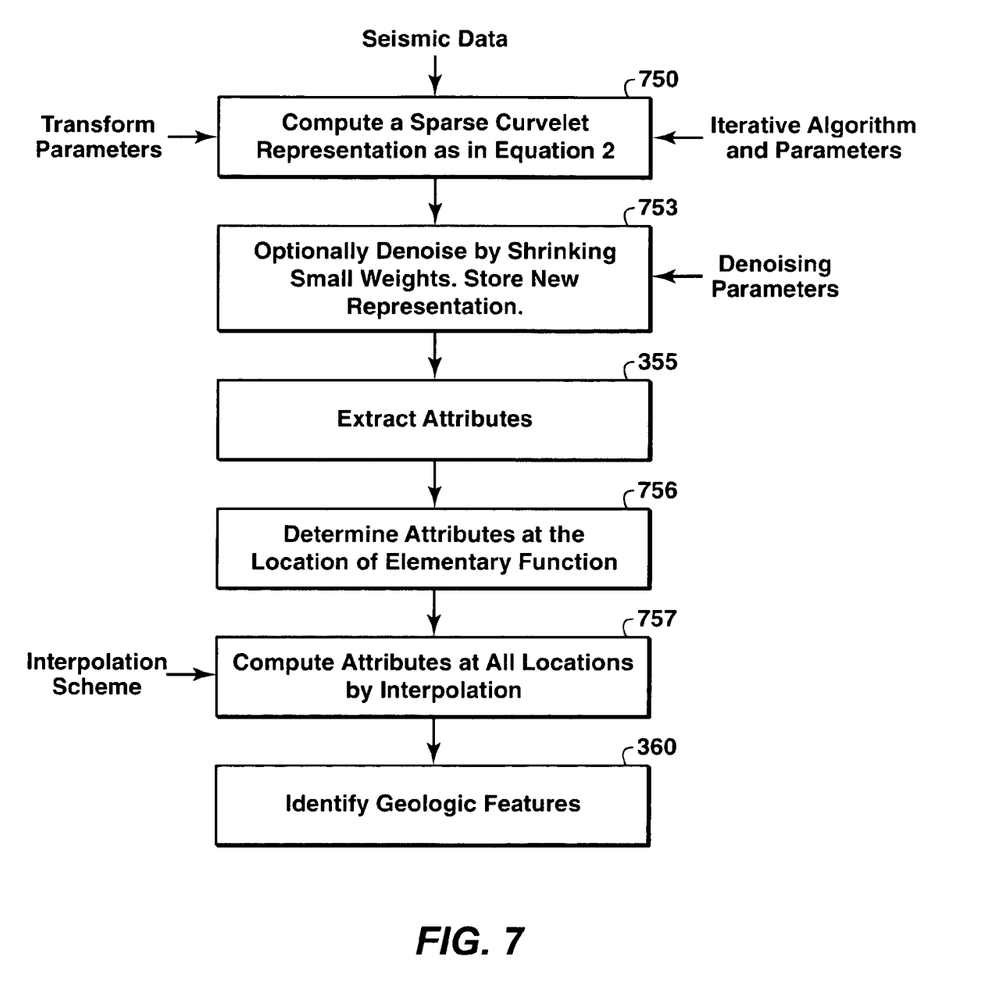
FIG. 7 is a flow chart describing a particular embodiment of the present inventive method wherein curvelet-based denoising is performed, attribute data volumes are generated, and an interpolation scheme is used to compute attributes at desired locations.

1. Identify weights of the elementary curvelet functions with the desired dip and frequency values.
2. Set to zero the weights of elementary functions that lie in a predetermined half-space of the Fourier domain.
3. Use the absolute value of the extracted weights as the dip-frequency amplitude at the location of the respective elementary functions. This step is shown in FIG. 7 as step 756.
4. Interpolate the available discrete set of attribute values to compute the amplitude-dip-frequency attribute values throughout the seismic volume. The interpolation is done because elementary functions with a specific dip and frequency are not located at every point in seismic data. This step is shown in FIG. 7 as step 757. This step can be performed using a variety of well-established techniques; see section on Interpolation in Wikipedia, The Free Encyclopedia (2006) [cited 2006 Nov. 3].— Available from:
http://en.wikipedia.org/w/
   index.php?title=Interpolation&oldid=82562556.

Similar to the amplitude-dip-frequency attribute volume, the Phase-dip-frequency attribute volume can be obtained by interpolating the phase of the weights identified in step (1). These two attribute volumes comprise Attribute volumes 1 and 2 shown on FIG. 4 for this application of the present inventive method, and the preceding steps 1-4 comprise step 356 of FIG. 4.

Figure 10A:
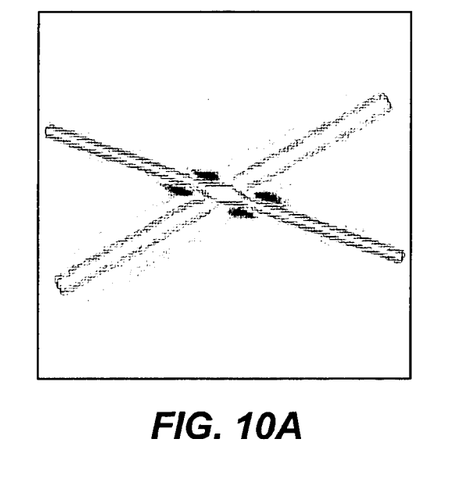
FIG. 10A illustrates a test image and FIGS. 10B-C illustrate two amplitude-dip-frequency attribute images.
Figure 10B:
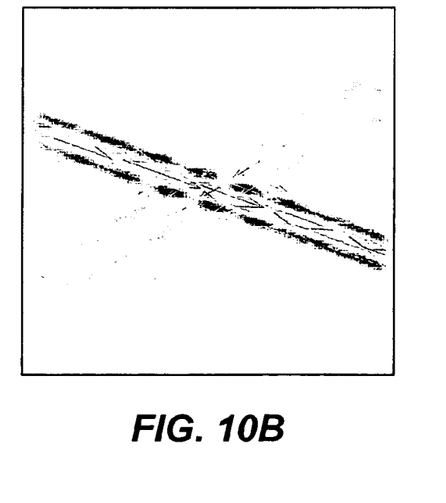
Figure 10C:
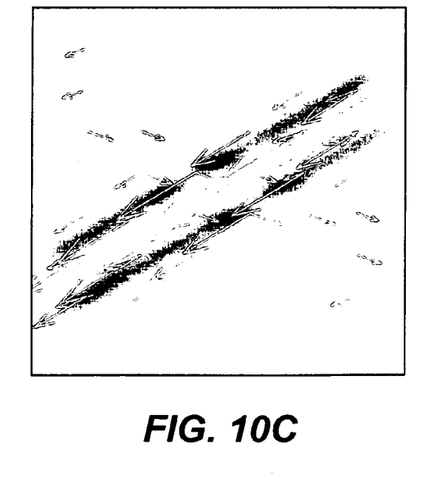

FIG. 10A illustrates a test image. FIGS. 10B-C illustrate two amplitude-dip-frequency attribute images. The arrows in FIGS. 10B and 10C indicate the amplitude and dip of seismic data components at low frequencies (16-31 Hz range) and mid-frequencies (8-16 Hz range), respectively. The arrows' orientations indicate the dip of the underlying seismic data, while their lengths indicate the amplitude of underlying seismic data with the specific dip and frequency.

In an alternate, more computationally expensive but more precise method to compute the amplitude-dip-frequency and phase-dip-frequency attribute volumes step 356 of FIG. 4 comprises the following steps:

1. Identify weights of the elementary curvelet functions with the desired dip and frequency values. Set all other weights to zero.
2. Set to zero the weights of elementary functions that lie in a predetermined half-space of the Fourier domain
3. Compute the inverse curvelet transform of the curvelet expansion resulting from step (2) to obtain a complex-valued volume.
4. The absolute value and phase of the complex valued volume provides the amplitude-dip-frequency and phase-dip-frequency attribute volumes respectively.

Dominant dip-frequency attribute: The dominant dip-frequency pair at an arbitrary point in the seismic volume can be obtained by combining all the amplitude-dip-frequency attribute volumes. A preferred way to construct the dominant dip-frequency attribute volume is by choosing the dip-frequency pair with the largest amplitude from all the amplitude-dip-frequency volumes.

Local Dip and Frequency attributes: The local dip at an arbitrary point in the seismic volume can be obtained by combining all the Amplitude-Dip-Frequency attribute volumes. A preferred way to construct the local dip attribute is by choosing the dip with the largest amplitude (or the largest amplitude after averaging across frequencies) from all the amplitude-dip-frequency volumes. The local frequency attribute volume can be extracted similarly.

Discontinuity attribute: As the curvelet representation contains dip attribute information as well as continuity information at different length scales, they can be used to generate discontinuity attributes.

Curvature attribute: As the dip at a given point in a seismic volume can be extracted from Equation (2), the curvature, which measures the change in dip, can also computed.

Curvelet-Domain Pattern Recognition without Intermediate Attribute Volume Generation The seismic data interpreter can be overwhelmed trying to analyze multiple attribute volumes simultaneously. However, in another embodiment of the invention illustrated by the flowchart of FIG. 5, key geologic features can be identified by searching the curvelet representation directly without generating any intermediate attribute volumes. This approach is possible because the curvelet representation of the seismic data can be used to generate appropriate geologic attributes such as dip, frequency and amplitude. Such an approach benefits from computational and memory efficiency because curvelets are designed to provide compressed representations for seismic data (that is, most of the data energy is concentrated in a few large curvelet expansion coefficients). The basic steps are:

1. Compute and store the curvelet representation (Equation (2)) for seismic data (step 350).
2. Extract desired attributes and their interdependencies from the data's curvelet representation (step 355).
3. Identify geologic features, in this embodiment by operating directly on the curvelet representation (step 560). In this step, the extracted attributes such as the dip, frequency, and location for each curvelet elementary function are used along with the weights from Equation (2).

Step 560 can be performed in several ways. For example, a pattern recognition algorithm could be used to identify desirable geologic features. Such an algorithm could be trained by learning (manual or automatic) the structure from existing images, or by recasting the contextual knowledge provided by experts (amplitude anomaly, low frequency, flat spots, geological constraints etc) in terms of curvelet representations. The geologic/geophysical feature identification would then employ appropriate algorithms to identify regions whose curvelet coefficients match or nearly match the sought pattern.

Another way to perform step 560 is to identify anomalous regions in seismic data without a training image. Several hydrocarbon-rich regions can be associated with anomalous amplitudes, anomalous low frequency, and anomalous structures like flat reflections juxtaposed with dipping structures. Regions containing any such anomalous features can be identified by simply operating on the curvelet representation of the data. As an example, anomalous zones could be detected by employing Principal Component Analysis ("PCA"—see Chapter 3.8.1 and 10.13.1 in Duda et al., Pattern Classification (2nd Edition), Wiley-Interscience (2000)) or other data analysis method, on the curvelet representation of the data (Equation (2)). The key steps in this embodiment of the present inventive method are as follows.

1. Compute and store the curvelet representation (Equation (2)) for seismic data (step 350).
2. Extract desired attributes and their interdependencies from the data's curvelet representation (step 355).
3. Associate different locations in the data with a vector whose entries are based on curvelet representation weights. It is considered preferable to associate each location with a vector comprising the weights of all curvelet elementary functions (all frequencies and angles) that lie close to the location.
4. Employ PCA on the associated vectors.
5. Process the PCA components to identify anomalous regions. For example, anomalous regions can be identified from by subtracting the dominant PCA components from the vectors. Steps 3-5 here comprise step 560 in FIG. 5.

Figure 11A:
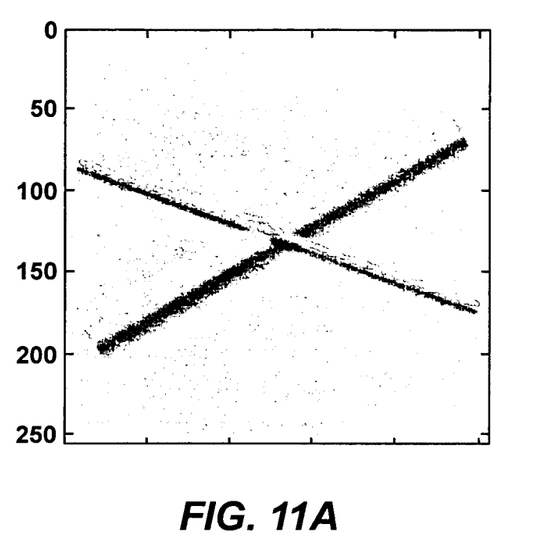
FIG. 11A illustrates a test image.
Figure 11B:
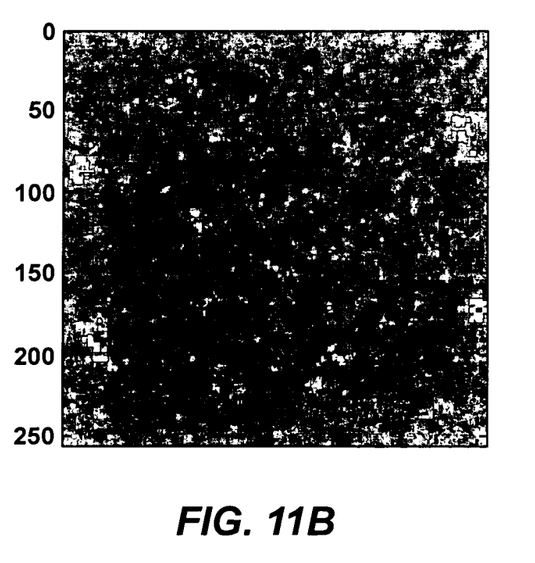
FIG. 11B illustrates the anomalies detected using curvelet representations in conjunction with PCA.

FIGS. 11A-B illustrate the anomalies detected using the steps described above. FIG. 11A shows a test image with two reflectors. In this image, the abrupt terminations of the reflectors are anomalous events that need to be detected. The bright regions in FIG. 11B highlight the location of the anomalies detected by using curvelets in conjunction with PCA. Note that the detected anomalous regions in FIG. 11B coincide perfectly with abrupt reflector terminations in FIG. 11A, as desired.

In steps (4-5) of the embodiment described above, Nonlinear Component Analysis ("NLCA") or Independent Component Analysis ("ICA") (see Chapters 10.13.2 and 10.13.3 in Duda et al., Pattern Classification (2nd Edition), Wiley-Interscience (2000)) can also be employed instead of PCA. Other algorithms from the area of pattern recognition such as such as neural network methods or support vector machines ("SVM"—see chapters 4.3.5, 6.6.1 and 5.11 in Pattern Classification) can also be employed.

Curvelet Representation-Based Seismic Pattern Recognition for Noisy Data

Figure 6:
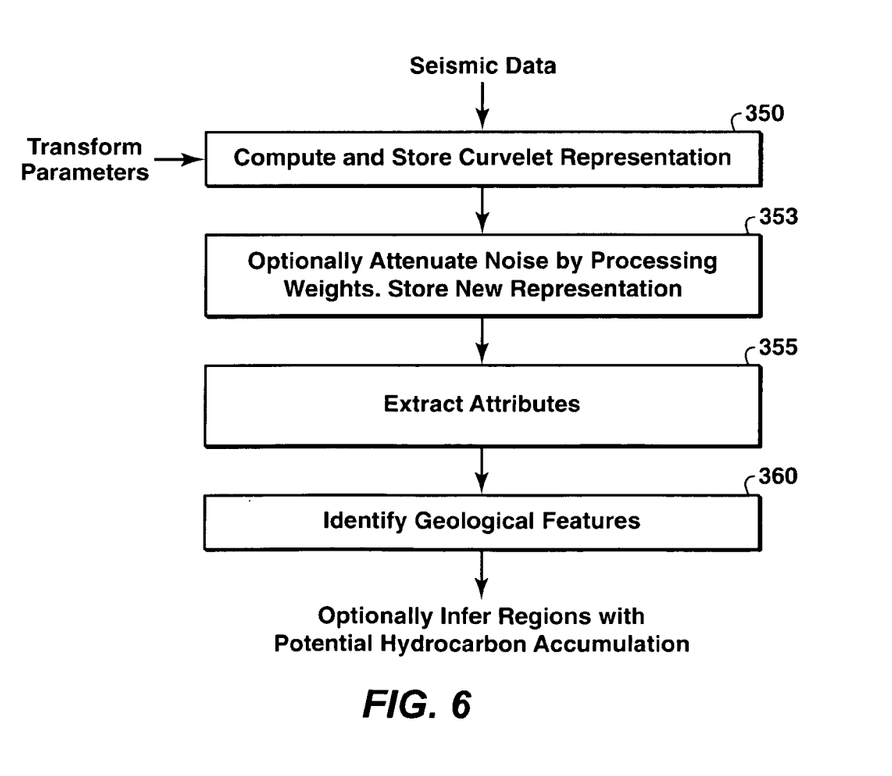
FIG. 6 is a flow chart describing the inventive method of FIG. 3 with an optional denoising step included.

Recent work (Hennenfent and Herrmann, "Seismic denoising with nonuniformly sampled curvelets," *Computing in Science and Engineering* 8, 16-25 (2006); and Yarham et al., "Curvelet-based ground roll removal," *76th SEG Annual Meeting, Expanded Abstracts*, SPNA 1.7 (2006)) have demonstrated that curvelet representations are very useful for attenuating noises that corrupt seismic data. The key step in noise removal involves shrinking the small weights in the curvelet representation given by Equation (2). The framework of the present inventive method allows easy incorporation of optional noise attenuation, thereby making identified geologic features robust to noise. FIG. 6 shows such a step (353) inserted into the flowchart of FIG. 3. FIG. 6 is described in more detail:

1. Compute the curvelet representation (Equation (2)) for seismic data (step 350).
2. Optionally attenuate noise by processing the weights in Equation (2). For example, the weights can be processed using a published shrinkage method such as hard or soft thresholding (see Mallat (1998) pgs. 441-446). The amount of shrinkage can be adapted by the user based on the noise corrupting the seismic data. Store the new representation. (Step 353)
3. Use the stored curvelet representation to extract desired attributes (step 355).
4. The extracted attributes, along with stored curvelet representation, can then be used to identify geologic features by humans or computer algorithms (step 360).

FIG. 7 illustrates a specific embodiment where curvelet-based noise attenuation is combined with attribute volume generation described above. FIG. 7 is described in more detail:

1. Compute the curvelet representation (Equation (2)) with sparse weights for seismic data by employing the iterative method described above in the background section (step 750). This step is a specific embodiment of general step 350.
2. Optionally shrink the weights in Equation (2) using soft thresholding (see, for example, Mallat (1998) pgs. 441-446). (Step 753) This step is a specific embodiment of general step 353.
3. Use the stored curvelet representation to extract desired attributes (step 355).
4. Determine the desired set of attributes at the location of the each elementary function (step 756).
5. Interpolate the available discrete set of attribute values to compute the attribute values throughout the seismic volume (step 757).
6. The extracted attributes, along with stored curvelet representation, can then used to identify geologic features by humans or computer algorithms (step 360).

Rapid Local Attribute Generation from Curvelet-Based Representation

A small region of interest ("ROI") in a seismic volume can be approximated very well by a small subset of weights and curvelet elementary functions in Equation (2). This subset comprises only those curvelet elementary functions that are (essentially) entirely localized in the ROI. Consequently, attribute volumes for a small ROI can be quickly generated using just a small subset of weights and curvelet elementary functions from the stored curvelet representation Equation (2) of the whole dataset. Such an approach would be particularly useful for interactive interpretation of multiple attribute volumes because the attribute volumes can be generated "on-the-fly" and need not be stored.

Curvelet-Based Seismic Pattern Recognition from Multiple Seismic Volumes

Figure 8:
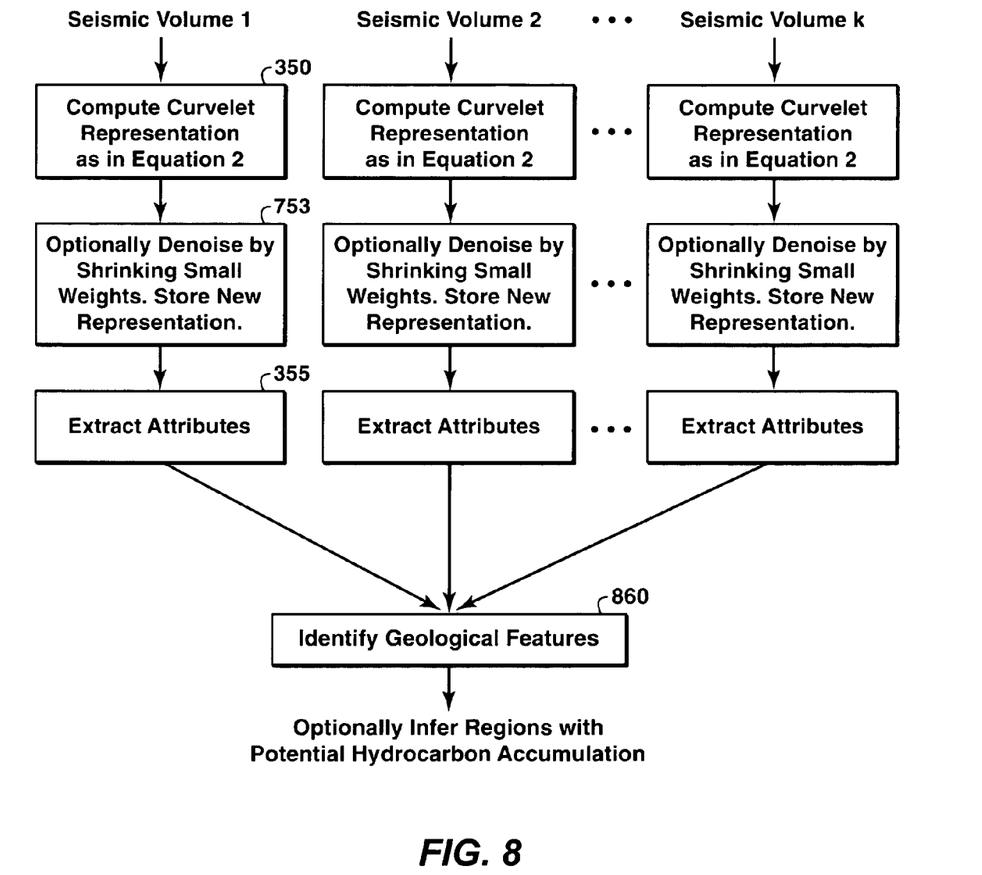
FIG. 8 is a flow chart describing the present inventive method when multiple seismic input data volumes are available.

Curvelet-based seismic pattern recognition can be extended to cases where multiple seismic input volumes are available. FIG. 8 shows how each input seismic data volume is processed according to the first three steps of FIG. 6, and then the streams are combined for the step of identifying geologic features:

1. Compute the curvelet representation (Equation (2)) for each seismic data volume (step 350).
2. Optionally denoise the curvelet representations and store it (step 753).
3. Extract desired attributes and their interdependencies for each dataset from the respective curvelet representations (step 355).
4. The collection of extracted attributes, along with stored curvelet representations, can then be used jointly by humans or computer algorithms to identify geologic features (step 860).

For example, using the proposed curvelet-based framework, regions with anomalies that span across multiple datasets can be identified. One approach would associate each location in the data with a vector whose entries are based on curvelet representations of all the seismic volumes. Then a suitable algorithm such as PCA, ICA, or SVM can be employed on these vectors to identify anomalous regions.

As stated previously, a key limitation of all conventional local amplitude and phase extraction methods stems from analyzing each trace separately. This approach can create significant noise because the individual decompositions are not required to honor the smoothly varying amplitude and phase content of seismic reflectors across multiple traces. In contrast, the present inventive curvelet-based method returns less noisy attributes that honor the smooth amplitude and phase content variation across multiple traces. Further, unlike existing methods, the present inventive method can also compute the interdependency between amplitude/phase and frequency. For example, the inventive method can compute the local amplitude and phase of seismic events with a specific frequency and/or dip.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the art will recognize that at least some of the steps of the invention are preferably performed on or with the aid of a computer, i.e. the invention is computer implemented in its preferred embodiments. In such instances, the output of computer-performed steps may be either downloaded or saved to computer memory.

The invention claimed is:

1. A method for identifying geological features of a subsurface region from geophysical data gathered from the region, said method comprising:
    (a) selecting a transform from a group consisting of curvelet transforms, contourlet transforms, and surfacelet transforms, and selecting a corresponding basis set of elementary functions, called curvelet functions;
    (b) transforming the geophysical data into a curvelet representation of the data using the selected basis set and transform, wherein the geophysical data are represented as a series expansion of curvelet functions each multiplied by a corresponding expansion coefficient, wherein the expansion coefficients constitute weights in the curvelet expansion;
    (c) computing the geophysical attributes dip, frequency and location of each curvelet function used in the curvelet representation of the geophysical data; and
    (d) identifying geologic features directly from the weights and computed geophysical attributes of the curvelet functions;
wherein at least one of (b) and (c) is performed using a computer.

2. The method of claim 1, wherein a pattern recognition algorithm is used to identify geologic features directly from the weights and computed geophysical attributes of the curvelet functions.

3. The method of claim 1, wherein the geologic features are identified by employing principal component analysis (PCA), independent component analysis (ICA), or non-linear component analysis (NLCA) on the curvelet representation.

4. The method of claim 3, wherein identifying geologic features directly from the curvelet representation comprises:
(a) associating different locations in the data with different vectors whose entries are based on curvelet representation weights;
(b) employing PCA, ICA or NLCA on the associated vectors, thus generating components; and
(c) processing the generated components to identify one or more anomalous regions and associating the one or more anomalous regions with geologic features.

5. The method of claim 4, wherein each different data location is associated with a vector whose components comprise weights from the curvelet representation of the data for curvelet elementary functions, all frequencies and angles, that lie within a specified proximity of the location.

6. The method of claim 4, wherein anomalous regions are identified by subtracting dominant PCA, ICA or NLCA components from the vectors.

7. A method for producing hydrocarbons from a subsurface region, comprising:
(a) obtaining geophysical data from a survey of the subsurface region;
(b) obtaining an identification of geologic features of the subsurface region by applying a method of claim 1 to the geophysical data
(c) drilling a well into a portion of the subsurface region characterized by having geologic features indicative of hydrocarbon potential; and
(d) producing hydrocarbons from the well.

8. A method for identifying geological features of a subsurface region from geophysical data gathered from the region, said method comprising:
(a) selecting a complex transform from a group consisting of curvelet transforms, contourlet transforms, and surfacelet transforms, and selecting a corresponding basis set of complex elementary functions, called curvelet functions;
(b) transforming the geophysical data into a curvelet representation of the data using the selected basis set and transform, wherein the geophysical data are represented as a series expansion of curvelet functions each multiplied by a corresponding complex expansion coefficient, wherein the expansion coefficients constitute weights in the curvelet expansion;
(c) extracting one or more geophysical attributes, including at least one of local amplitude and local phase, from the curvelet representation of the geophysical data and creating an intermediate data volume for local amplitude or local phase, or both, by steps comprising:
(i) setting a selected subset of the weights in the curvelet expansion of the geophysical functions lying in a predetermined half space in multi-dimensional Fourier frequency domain;
(ii) computing the inverse transform of the curvelet expansion from step (i) to obtain a complex valued data volume;
(iii) determining a local amplitude data volume as the absolute value of the complex numbers in the complex-valued data volume; and
(iv) determining a local phase data volume as the phase of each complex number in the complex-valued data volume; and
(d) identifying geologic features from the intermediate data volume or volumes;
wherein at least one of (b) and (c) is performed using a computer.

9. A method for identifying geological features of a subsurface region from geophysical data gathered from the region, said method comprising:
(a) selecting a complex transform from a group consisting of curvelet transforms, contourlet transforms, and surfacelet transforms, and selecting a corresponding basis set of complex elementary functions, called curvelet functions;
(b) transforming the geophysical data into a curvelet representation of the data using the selected basis set and transform, wherein the geophysical data are represented as a series expansion of curvelet functions each multiplied by a corresponding complex expansion coefficient, wherein the expansion coefficients constitute weights in the curvelet expansion;
(c) extracting one or more geophysical attributes, including at least one of local amplitude and local phase, from the curvelet representation of the geophysical data, and creating an intermediate data volume for local amplitude or local phase, or both, wherein local amplitude and local phase intermediate data volumes are created at specified dips, frequencies, and locations by steps comprising:
(i) identifying weights of the elementary curvelet functions with the desired dip, frequency, and location values, setting all other weights to zero;
(ii) setting to zero the weights of elementary functions that lie in a predetermined half-space in multi-dimensional Fourier frequency domain;
(iii) computing the inverse transform of the curvelet expansion from step (ii) to obtain a complex-valued data volume; and
(iv) determining the amplitude-dip-frequency and phase-dip-frequency attribute volumes as the absolute value and phase of the complex-valued data volume, respectively; and
(d) identifying geologic features from the intermediate data volume or volumes;
wherein at least one of (b) and (c) is performed using a computer.

10. A method for identifying geological features of a subsurface region from geophysical data gathered from the region, said method comprising:
(a) selecting a complex transform from a group consisting of curvelet transforms, contourlet transforms, and surfacelet transforms, and selecting a corresponding basis set of complex elementary functions, called curvelet functions;
(b) transforming the geophysical data into a curvelet representation of the data using the selected basis set and transform, wherein the geophysical data are represented as a series expansion of curvelet functions each multiplied by a corresponding complex expansion coefficient, wherein the expansion coefficients constitute weights in the curvelet expansion;
(c) extracting one or more geophysical attributes, including at least one of local amplitude and local phase, from the curvelet representation of the geophysical data, and creating an intermediate data volume for local amplitude or local phase, or both, wherein local amplitude and local phase intermediate data volumes are created at specified dips, frequencies and locations by steps comprising:
(i) identifying and extracting weights of the elementary curvelet functions with the specified dip, frequency, and location values, setting to zero the weights of elementary functions that lie in a predetermined half-space in multi-dimensional Fourier frequency domain;
(ii) using the absolute value and the phase of the extracted complex-valued weights as the dip-frequency amplitude and dip-frequency phase respectively at the location of the respective elementary functions; and (iii) interpolating the amplitude and phase attribute values from the previous step to compute the dip-frequency dependent amplitude and phase attribute values throughout a geophysical data volume; and (d) identifying geologic features from the intermediate data volume or volumes;

wherein at least one of (b) and (c) is performed using a computer.

11. A method for identifying geological features of a subsurface region from geophysical data gathered from the region, said method comprising:
(a) selecting a transform from a group consisting of curvelet transforms, contourlet transforms, and surfacelet transforms, and selecting a corresponding basis set of elementary functions, called curvelet functions;
(b) transforming the geophysical data into a curvelet representation of the data using the selected basis set and transform, wherein the geophysical data are represented as a series expansion of curvelet functions each multiplied by a corresponding expansion coefficient, wherein the expansion coefficients constitute weights in the curvelet expansion, and wherein the curvelet representation of the geophysical data employs a sparse set of weights in the curvelet expansion; and wherein the curvelet representation is obtained by steps comprising:
  (i) computing an initial estimate of the weights by employing a forward transform of the seismic data;
  (ii) processing the weights by shrinking;
  (iii) computing the error between the seismic data signal and the signal represented by the expansion using the processed weights;
  (iv) computing expansion weights for the error signal as in step (i);
  (v) adding the error signal weights to the processed weights from step (ii) to create an updated set of processed weights; and
  (vi) repeating steps (ii)-(v) until the error falls below a pre-selected value or other stopping point is reached;
(c) extracting one or more geophysical attributes from the curvelet representation of the geophysical data; and
(d) identifying geologic features from the one or more extracted attributes;

wherein at least one of (b) and (c) is performed using a computer.

12. The method of claim 1 or claim 11, wherein the transformed data can be represented as $$\text{signal}(x_1, \ldots, x_m) = \text{real}\left(\sum_i weights_i \times curvelet\_elementary\_fns_i(x_1, \ldots, x_m)\right)$$

wherein the weights are expansion coefficients by which the geophysical data signal is expanded in a series of the curvelet elementary functions.

13. The method of claim 1 or claim 11, wherein the transform is a complex transform and the curvelet functions are complex quantities and the weights are complex numbers.

14. The method of any of claims 8, 9, 10 and 11, wherein the extraction of geophysical attributes comprises computing at least one of dip, frequency and location of each curvelet function used in the curvelet representation of the geophysical data.

15. The method of any of claims 1, 8, 9, 10, and 11, wherein the transform is a multi-resolution directional transform, and further comprising selecting frequency annuli and angle partitions at each annulus for the transform, said selection based on considerations of data resolution.

16. The method of any of claims 1, 8, 9, 10, and 11, wherein the geologic features identified are indicative of hydrocarbon potential.

17. The method of any of claims 1, 8, 9, 10, wherein the curvelet representation of the geophysical data is a forward transform of the data.

18. The method of any of claims 1, 8, 9 and 10, wherein the curvelet representation of the geophysical data employs a sparse set of weights in the curvelet expansion.

19. The method of any of claims 1, 8, 9, 10 and 11, wherein the identification of geologic features step is performed by computer algorithm.

20. The method of any of claims 1, 8, 9, 10 and 11, further comprising obtaining at least one additional set of geophysical data from the subsurface region, and performing steps (a)-(c) on each data set and then combining those results before step (d).

21. The method of any of claims 1, 8, 9, 10, and 11, further comprising attenuating noise in the data by processing the curvelet expansion weights before attributes are extracted.

22. The method of claim 21, wherein the processing comprises shrinking the weights by hard or soft thresholding.

23. The method of any of claims 1, 8, 9, 10, and 11, wherein the transform is selected based at least in part on its directional resolution capability.

24. The method of any of claims 8, 9 and 10, wherein an m-dimensional geophysical data set (signal) is expressed using the transform as a linear, weighted combination of special elementary functions as follows:

$$\text{signal}(x_1, \ldots, x_m) = \text{real}\left(\sum_i complex\_weights_i \times complex\_elementary\_fns_i(x_1, \ldots, x_m)\right)$$

wherein the complex elementary functions are the selected curvelet basis set, and the weights are the expansion coefficients by which the geophysical data signal is expanded in a curvelet series.

* * * * *